United States Patent
Klemen et al.

(10) Patent No.: US 7,217,211 B2
(45) Date of Patent: May 15, 2007

(54) TWO MODE ELECTRICALLY VARIABLE TRANSMISSION WITH EQUAL FORWARD AND REVERSE INPUT-SPLIT MODAL PERFORMANCE

(75) Inventors: Donald Klemen, Carmel, IN (US); Michael R. Schmidt, Carmel, IN (US); Brendan M. Conlon, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 110 days.

(21) Appl. No.: 11/187,524

(22) Filed: Jul. 22, 2005

(65) Prior Publication Data

US 2007/0021256 A1 Jan. 25, 2007

(51) Int. Cl.
*F16H 3/72* (2006.01)
(52) U.S. Cl. .......................... 475/5; 475/276; 475/280; 180/65.2; 180/65.4; 180/65.7
(58) Field of Classification Search .................. 475/5, 475/276, 278, 279, 280; 477/3; 180/65.2, 180/65.4, 65.7
See application file for complete search history.

(56) References Cited

U.S. PATENT DOCUMENTS

| 5,730,676 | A | * | 3/1998 | Schmidt | 475/5 |
| 5,931,757 | A |   | 8/1999 | Schmidt | 475/2 |
| 6,527,658 | B2 |  | 3/2003 | Holmes et al. | 475/5 |
| 6,551,208 | B1 | * | 4/2003 | Holmes et al. | 475/5 |
| 6,953,409 | B2 | * | 10/2005 | Schmidt et al. | 475/5 |
| 7,128,675 | B2 | * | 10/2006 | Klemen et al. | 475/5 |

* cited by examiner

*Primary Examiner*—David D. Le
(74) *Attorney, Agent, or Firm*—Christopher DeVries

(57) ABSTRACT

An electrically variable transmission includes a power source, three differential gear sets, first and second motor/generators each connected to at least one of the gear sets, and torque-transmitting mechanisms. An input member transfers power from the power source through the differential gear sets to an output member. The torque-transmitting mechanisms are selectively engageable to provide an input-split first electrically variable mode having equal forward and reverse speed ratios for given input speeds and a compound, power-split second electrically variable mode. Torque provided from the power source is added to torque provided from the second motor generator in both forward and reverse electrically variable modes.

19 Claims, 2 Drawing Sheets

TWO MODE ELECTRICALLY VARIABLE TRANSMISSION WITH EQUAL FORWARD AND REVERSE INPUT-SPLIT MODAL PERFORMANCE

TECHNICAL FIELD

The present invention relates to electrically variable transmissions with selective operation both in power split variable speed ratio ranges and fixed speed ratios, having three planetary gear sets, two motor/generators and a plurality of torque-transmitting mechanisms to achieve equal forward and reverse speed ranges.

BACKGROUND OF THE INVENTION

Internal combustion engines, particularly those of the reciprocating piston type, currently propel most vehicles. Such engines are relatively efficient, compact, lightweight, and inexpensive mechanisms by which to convert highly concentrated energy in the form of fuel into useful mechanical power. A novel transmission system, which can be used with internal combustion engines and which can reduce fuel consumption and emissions, may be of great benefit to the public.

The wide variation in the demands that vehicles typically place on internal combustion engines increases fuel consumption and emissions beyond the ideal case for such engines. Typically, a vehicle is propelled by such an engine, which is started from a cold state by a small electric motor and relatively small electric storage batteries, then quickly placed under the loads from propulsion and accessory equipment. Such an engine is also operated through a wide range of speeds and a wide range of loads and typically at an average of approximately a fifth of its maximum power output.

A vehicle transmission typically delivers mechanical power from an engine to the remainder of a drive system, such as fixed final drive gearing, axles and wheels. A typical mechanical transmission allows some freedom in engine operation, usually through alternate selection of five or six different drive ratios, a neutral selection that allows the engine to operate accessories with the vehicle stationary, and clutches or a torque converter for smooth transitions between driving ratios and to start the vehicle from rest with the engine turning. Transmission gear selection typically allows power from the engine to be delivered to the rest of the drive system with a ratio of torque multiplication and speed reduction, with a ratio of torque reduction and speed multiplication known as overdrive, or with a reverse ratio.

An electric generator can transform mechanical power from the engine into electrical power, and an electric motor can transform that electric power back into mechanical power at different torques and speeds for the remainder of the vehicle drive system. This arrangement allows a continuous variation in the ratio of torque and speed between engine and the remainder of the drive system, within the limits of the electric machinery. An electric storage battery used as a source of power for propulsion may be added to this arrangement, forming a series hybrid electric drive system.

The series hybrid system allows the engine to operate with some independence from the torque, speed and power required to propel a vehicle, so the engine may be controlled for improved emissions and efficiency. This system allows the electric machine attached to the engine to act as a motor to start the engine. This system also allows the electric machine attached to the remainder of the drive train to act as a generator, recovering energy from slowing the vehicle into the battery by regenerative braking. A series electric drive suffers from the weight and cost of sufficient electric machinery to transform all of the engine power from mechanical to electrical in the generator and from electrical to mechanical in the drive motor, and from the useful energy lost in these conversions.

A power-split transmission can use what is commonly understood to be "differential gearing" to achieve a continuously variable torque and speed ratio between input and output. An electrically variable transmission can use differential gearing to send a fraction of its transmitted power through a pair of electric motor/generators. The remainder of its power flows through another, parallel path that is all mechanical and direct, of fixed ratio, or alternatively selectable.

One form of differential gearing, as is well known to those skilled in this art, may constitute a planetary gear set. Planetary gearing is usually the preferred embodiment employed in differentially geared inventions, with the advantages of compactness and different torque and speed ratios among all members of the planetary gear set. However, it is possible to construct this invention without planetary gears, as by using bevel gears or other gears in an arrangement where the rotational speed of at least one element of a gear set is always a weighted average of speeds of two other elements.

A hybrid electric vehicle transmission system also includes one or more electric energy storage devices. The typical device is a chemical electric storage battery, but capacitive or mechanical devices, such as an electrically driven flywheel, may also be included. Electric energy storage allows the mechanical output power from the transmission system to the vehicle to vary from the mechanical input power from the engine to the transmission system. The battery or other device also allows for engine starting with the transmission system and for regenerative vehicle braking.

An electrically variable transmission in a vehicle can simply transmit mechanical power from an engine input to a final drive output. To do so, the electric power produced by one motor/generator balances the electrical losses and the electric power consumed by the other motor/generator. By using the above-referenced electrical storage battery, the electric power generated by one motor/generator can be greater than or less than the electric power consumed by the other. Electric power from the battery can sometimes allow both motor/generators to act as motors, especially to assist the engine with vehicle acceleration. Both motors can sometimes act as generators to recharge the battery, especially in regenerative vehicle braking.

A successful substitute for the series hybrid transmission is the two-range, input-split and compound-split electrically variable transmission now produced for transit buses, as disclosed in U.S. Pat. No. 5,931,757, issued Aug. 3, 1999 to Michael R. Schmidt, commonly assigned with the present application, and hereby incorporated by reference in its entirety. Such a transmission utilizes an input means to receive power from the vehicle engine and a power output means to deliver power to drive the vehicle. First and second motor/generators are connected to an energy storage device, such as a battery, so that the energy storage device can accept power from, and supply power to, the first and second motor/generators. A control unit regulates power flow among the energy storage device and the motor/generators as well as between the first and second motor/generators.

Operation in first or second variable-speed-ratio modes of operation may be selectively achieved by using clutches in the nature of first and second torque transfer devices. In the first mode, an input-power-split speed ratio range is formed by the application of the first clutch, and the output speed of the transmission is proportional to the speed of one motor/generator. In the second mode, a compound-power-split speed ratio range is formed by the application of the second clutch, and the output speed of the transmission is not proportional to the speeds of either of the motor/generators, but is an algebraic linear combination of the speeds of the two motor/generators. Operation at a fixed transmission speed ratio may be selectively achieved by the application of both of the clutches. Operation of the transmission in a neutral mode may be selectively achieved by releasing both clutches, decoupling the engine and both electric motor/generators from the transmission output. The transmission incorporates at least one mechanical point in its first mode of operation and at least two mechanical points in its second mode of operation.

U.S. Pat. No. 6,527,658, issued Mar. 4, 2003 to Holmes et al, commonly assigned with the present application, and hereby incorporated by reference in its entirety, discloses an electrically variable transmission utilizing two planetary gear sets, two motor/generators and two clutches to provide input-split, compound split, neutral and reverse modes of operation. Both planetary gear sets may be simple, or one may be individually compounded. An electrical control member regulates power flow among an energy storage device and the two motor/generators. This transmission provides two ranges or modes of electrically variable transmission (EVT) operation, selectively providing an input-power-split speed ratio range and a compound-power-split speed ratio range. One fixed speed ratio can also be selectively achieved.

SUMMARY OF THE INVENTION

The present invention provides an electrically variable transmission offering several advantages over conventional automatic transmissions for use in hybrid vehicles, including improved vehicle acceleration performance, improved launch, and enhanced reverse power capability. An object of the invention is to provide the best possible energy efficiency and emissions for a given engine. In addition, optimal performance, capacity, package size, and ratio coverage for the transmission are sought.

The electrically variable transmission of the present invention provides first, second and third differential gear sets, two electric machines serving interchangeably as motors or generators, and a plurality of selectable torque-transmitting mechanisms. Preferably, the differential gear sets are planetary gear sets, but other gear arrangements may be implemented, such as bevel gears or differential gearing to an offset axis. The torque-transmitting mechanisms are selectively engageable to provide an input-split first electrically variable mode having a forward and a reverse range of speed ratios. The forward and reverse ranges have equal forward and reverse speed ratios for given input speeds (i.e., at a given engine speed, a given first motor/generator speed and a given second motor/generator speed, the forward speed ratio is equal to the reverse speed ratio (although opposite in direction)). Substantially equal fixed forward and reverse speed ratios are also achievable. The first gear set is interconnected between the input member and the second motor/generator in a manner that enables a connecting member between the second motor/generator and one of the other gear sets to rotate in the same direction as the input member. This ensures that torque provided from the power source will be added to torque provided from the second motor/generator at the output member.

In this description, the first, second and third planetary gear sets may be counted left to right or right to left.

Each of the planetary gear sets has three members. The first, second or third member of each planetary gear set can be any one of a sun gear member, ring gear member or a carrier member of a planet carrier assembly member.

Each carrier member can be either a single-pinion carrier (simple) or a double-pinion carrier (compound), depending on the desired ratio of each gear set.

An input member is continuously connected with a member of one of the gear sets, preferably with a first member of the first planetary gear set. The output member is continuously connected with another member of one of the gear sets, preferably with a member of one of the second or third planetary gear sets.

Preferably, an interconnecting member continuously connects a member of the second planetary gear set with a member of the third planetary gear set.

The first motor/generator is mounted to the transmission case (or ground) and is continuously connected to a member of the first planetary gear set, preferably the second member.

The second motor/generator is mounted to the transmission case and is continuously connected to a member of the third planetary gear set, preferably the third member.

The selectable torque transfer devices are engaged singly or in combinations of two or three to yield an EVT with a continuously variable range of speeds (including reverse) and up to six mechanically fixed forward speed ratios. A "fixed speed ratio" is an operating condition in which the mechanical power input to the transmission is transmitted mechanically to the output, and no power flow (i.e., almost zero) is necessary in the motor/generators. An electrically variable transmission that may selectively achieve several fixed speed ratios for operation near full engine power can be smaller and lighter for a given maximum capacity. Fixed ratio operation may also result in lower fuel consumption when operating under conditions where engine speed can approach its optimum without using the motor/generators. A variety of fixed speed ratios and variable ratio spreads can be realized by suitably selecting the tooth ratios of the planetary gear sets.

Each embodiment of the electrically variable transmission disclosed has an architecture in which neither the transmission input nor output is directly connected to a motor/generator. This allows for a reduction in the size and cost of the electric motor/generators required to achieve the desired vehicle performance.

A first, second, third (and optional fourth, fifth and sixth) of the torque-transmitting mechanisms and the first and second motor/generators are operable to provide various operating states in the electrically variable transmission, including energy storage forward and reverse propulsion states (i.e., "battery mode"), an EVT reverse input split mode, fixed ratio reverse, and EVT input split first forward mode (Mode I) and compound split second mode (Mode II) both Mode I and Mode II including continuously variable ranges, a fixed ratio forward state with an input to output speed ratio nearly equal to the reverse fixed state, and multiple other forward fixed ratio states. The speed or torque ratios of the output member/input member or the applicable motor/generator to output member, for given input speeds, in EVT reverse, battery reverse, fixed reverse, fixed forward launch and EVT forward launch are substantially equivalent.

The EVT forward and reverse launch modes are input-split modes. A compound split, second electrically variable forward mode is also provided.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
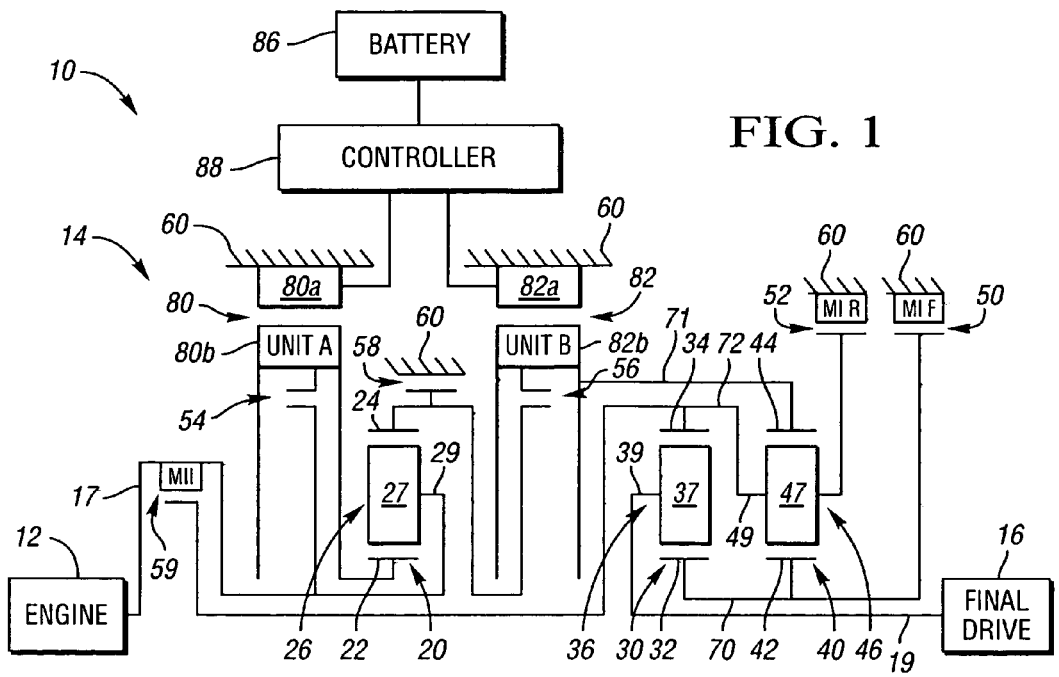
FIG. 1 is a schematic illustration of a powertrain including a first embodiment of an electrically variable transmission of the present invention.

Referring to the drawings, wherein like reference numbers refer to like components, FIG. 1 shows the powertrain 10, including an engine 12 connected to one embodiment of an electrically variable transmission (EVT) designated generally by the numeral 14. The transmission 14 is designed to receive at least a portion of its driving power from the engine 12. The engine 12 has an output shaft that serves as the input-member 17 of the transmission 14. A transient torque damper (not shown) may also be implemented between the engine 12 and the input member 17 of the transmission 14.

In the embodiment depicted, the engine 12 may be a fossil fuel engine, such as a diesel engine which is readily adapted to derive its available power output typically delivered at a constant number of revolutions per minute (rpm).

Irrespective of the means by which the engine 12 is connected to the transmission input member 17, the transmission input member 17 is operably connected to a first node 20. In the context of the present invention, a "node" is a junction of three of more power paths through which power is distributable between or among the power paths. For example, a node may receive power from a power path and distribute the power between or among two separate power paths. Similarly, a node may receive power from two power paths and transmit the power to a third power path. In FIG. 1, planetary gear set 20 acts as this power distribution node. Examples of devices that may function as nodes include a planetary gear set with a sun gear member, a ring gear member and a planet carrier assembly member, a dual path clutch, a differential, a Ravigneaux gear set, etc. Power paths may include input shafts, output shafts, electric motor/generators, rotatable interconnecting members, etc. The present transmission 14 also includes a second node 30 as well as a third node 40. Within the scope of the present invention, the nodes 20, 30, 40 are preferably planetary-gear sets. Accordingly, the remainder of the description may refer to the nodes as planetary gear sets.

The planetary gear set 20 employs an outer gear member 24, typically designated as a ring gear member. The ring gear member 24 circumscribes an inner gear member 22, typically designated as a sun gear member. A planet carrier assembly member 26 includes a carrier member 29 that rotatably supports a plurality of planet gear members 27 such that each planet gear member 27 meshingly engages both the ring gear member 24 and the sun gear member 22 of the first planetary gear set 20. The input member 17 is secured to the carrier member 29 of the planetary gear set 20.

The planetary gear set 30 also has an outer gear member 34, also often designated as the ring gear member, which circumscribes an inner gear member 32, also often designated as the sun gear member. The plurality of planet gear members 37 are also rotatably mounted on a carrier member 39 of a planet carrier assembly member 36 such that each planet gear member 37 simultaneously, and meshingly, engages both the ring gear member 34 and the sun gear member 32 of the planetary gear set 30.

The planetary gear set 40 also has an outer gear member 44, also often designated as the ring gear member, which circumscribes an inner gear member 42, also often designated as the sun gear member. The plurality of planet gear members 47 are also rotatably mounted on a carrier member 49 of a planet carrier assembly member 46 such that each planet gear member 47 simultaneously, and meshingly, engages both the ring gear member 44 and the sun gear member 42 of the planetary gear set 40.

An interconnecting member 70 continuously connects the sun gear member 32 with the sun gear member 42. Additionally, interconnecting member 72 continuously interconnects the ring gear member 34 with the planet carrier member 49.

The transmission 14 also incorporates first and second motor/generators 80 and 82, respectively. Motor/generators 80, 82 are also referred to as Unit A and Unit B. The stators 80a, 82a of the respective motor/generators 80, 82 are secured to the transmission housing 60. The rotor 80b of Unit A is secured to the sun gear member 22. The rotor 82b of Unit B 82 is secured to the ring gear member 44 via connecting member 71. The planetary gear set 20 is designed (via gear tooth numbers and connection of the engine 12 to the planet carrier assembly member 26) and Unit B 82 is controlled so that connecting member 71 rotates in the same direction as the engine 12. The output member 19 is secured to the carrier member 39.

Application (i.e., engagement) of torque-transmitting mechanism (brake) 50, shown schematically as MI F, connects an element of the planetary gear set 40 (sun gear member 42) with a stationary transmission housing 60 which, as discussed below, enables a forward ratio by causing an output member 19 to turn in a direction which propels the final drive 16 and a vehicle in a forward drive direction. Similarly, application of torque-transmitting mechanism (brake 52), shown schematically as MI R, engages an element of the third planetary gear set 40 (planet carrier assembly member 46) with the transmission housing 60 to thereby cause the output member 19 to rotate in an opposite direction associated with a reverse direction of the output member 19 and final drive 16, thereby causing reverse vehicle direction. Notably, if both brake 50 and brake 52 are simultaneously engaged, both planetary gear sets 30 and 40 will be held stationary by the transmission housing 60. Thus, if a vehicle is stopped on an incline, engaging both brakes 50 and 52 will allow the transmission housing 60 to provide reaction torque to prevent rolling movement when torque (due to gravity) is applied to the output member. Because neither motor/generator is used to perform this braking function, electrical loading is reduced.

It should also be noted, that a "Mode" of operation, is referred to when the input and output ratio is controlled by the speeds of Units A and B, whereas, "ratio" implies a fixed speed ratio between the input and output.

Because the second motor/generator 82 of the transmission 14 of FIG. 1 is controlled to always turn in the same direction as the engine 12 in Mode I forward or Mode I reverse, starting can occur in either forward or reverse range Mode I. Mode I forward ratio is achieved by engaging Mode I forward (MI F) brake 50 along with clutch 56. Similarly, Mode I reverse is achieved by engaging Mode I reverse (MI R) brake 52 along with clutch 56. Because the first planetary gear set 20 is utilized in the same manner in both Mode I forward and Mode I reverse, any difference in torque performance between these two modes is determined by gear tooth counts of the gear sets and 40. These tooth counts may be selected to result in equal forward and reverse torque performance, for given input speeds, as will be understood by those skilled in the art. The brakes 50, 52 may be shifted synchronously when the output member 19 is at zero speed (i.e., at idle). This is possible because at zero output speed, Unit B 82 is operating at zero RPM, as best shown and described below with respect to the chart of FIG. 2. When Unit B 82 is at zero RPM, all element speeds of the gear elements of planetary gear sets 30, 40 are at zero speed. The synchronous transition shift reduces idle speed frictional spin losses, since two of the three planetary gear sets 30, 40 are held at zero rotational speed at idle.

Unit A/Unit B/Engine Lock-Up Clutch

In order to further provide superior acceleration and efficiency, an optional Unit A/Unit B/Engine Lock-Up Clutch (54) is added to the transmission 14 as shown in FIG. 1. The lock-up clutch 54 may be engaged to connect Unit A 80 with the engine 12 and with the carrier member 29 to lock together both Units A and B 80, 82 respectively and the engine 12 for common rotation, allowing all three to function as drive sources to provide a combined torque to the connecting member 71. (Because Unit A 80 is connected to both the sun gear member 22 and the carrier member 29 when the clutch 54 is engaged, the planetary gear set 20 locks for common rotation, locking Unit A 80, Unit B 82 and the engine 12 together, allowing combined launch power.) This permits launch to occur in either EVT Mode I forward or EVT Mode I reverse. Launch in EVT mode and synchronous shifting to the first fixed mode ensures a smooth transition for the customer into and upon release of this high performance mode of operation. This transmission can perform this EVT to first fixed mode in either forward or reverse. Notice, that clutch 54 (with clutch 56 engaged) provides the forward and reverse mechanically locked first range of operation, where the engine, Unit A and Unit B are locked, and the forward and reverse ratio is selected by MI F and MI R engagement brakes 50, 52, respectively. Other fixed ranges are also available.

Electric Mode/Engine Off Disconnect and Engine Start Brake

The transmission 14 may also provide optional additional functions allowing engine start and vehicle drive using only energy provided by an energy storage device or electric power source 86 (rather than energy provided via the engine 12) such as a battery to propel one of the motor/generators 80, 82. Energy is transferred between the battery 86 and the motors/generators 80, 82 via a controller 88, as is understood by those skilled in the art. The electric power source 86 may be one or more batteries. Other electric power sources, such as fuel cell and ultra-capacitors, have the ability to provide, or store and dispense, electric power may be used in place of batteries without altering the concepts of the present invention. The ECU 88 is programmed to ensure that Unit B 82 rotates in a direction so that torque from Unit B 82 is added to torque from the engine 12 at the connecting member 71.

Notably, an electric start and an electric drive may be provided independently from one another to prevent unwanted vibration interactions. Specifically, a disconnect mechanism 56, which is preferably a torque-transmitting mechanism such as a clutch, may be disengaged to disconnect the ring gear 24 and therefore the engine 12 from Unit B 82 and the connecting member 71. When the torque-transmitting mechanism 56 is disengaged, Unit B 82 is available to provide torque to the connecting member 71 and, through either the forward or reverse respective gear sets 30, 40, to the output member 19. Those skilled in the art will recognize that when torque-transmitting mechanism 56 is engaged, Unit B is connected with the ring gear member 24 of planetary gear set 20. Because the carrier member 29 is connected with the engine 12 and the sun gear member 22 is connected with Unit A 80, the planetary gear set 20 has all three gear members engaged, thus being active to provide engine torque through either the planetary gear sets 30 or 40 (depending on the selection of forward Mode I brake 50 or reverse Mode I brake 52) to provide torque to the final drive 16 through output member 19. However, when the disconnect torque-transmitting mechanism 56 is not engaged, planetary gear set 20 is not active and engine torque is disconnected from the output member 19. In that instance, Unit B 82 is available to provide driving torque to the output member 19.

The transmission 14 may be provided with a brake 58 which may be engaged to provide a mechanical fixed ratio connection between Unit A 80 and the engine 12 and to provide reaction torque at the transmission housing 60 to allow Unit A 80 to act as a starter for the engine 12. The ability to provide an electric start via Unit A 80 with brake 58 applied ensures that maximum torque is provided to initiate starting and that minimum power is required, by eliminating secondary nodal power flows. This arrangement in FIG. 1 also provides three to four times Unit A torque to the input shaft of engine 12 to provide a very fast start. The brake 58 is engaged to start the engine 12 via Unit A 80 in this manner when the disconnect torque-transmitting mechanism 56 is disengaged. Accordingly, the disconnect torque-transmitting mechanism 56 ensures that electric drive via Unit B 82 is independent of the electric start of the engine 12 via the Unit A 80. This results in a smooth start, with the lowest required starting energy, as the inertial energy of planetary gear sets 30 and 40 are not in the mechanical path between Unit A 80 and engine 12 during electric start of the engine 12 via Unit A 80.

The transmission 14 may be utilized for regenerative engine inertial recovery of shift energy. This is accomplished by programming the controller 88 such that Unit A 80 acts as a generator to capture engine rotational energy that is temporarily not utilized as clutch engagement is altered during shifts.

FIG. 1 shows a torque-transmitting mechanism 59 such as a clutch which is engageable to connect an element of node 20 with an element of the second and third nodes 30, 40. The connection of node 20 to node 40 via the clutch 59 establishes a second electrically variable mode, Mode II. The clutch 59 may be referred to as a Mode II clutch and is in series with the engine 12 input. When the Mode II clutch 59 is engaged, the MI F brake 50 is synchronously disengaged, resulting in a compound, power-split, forward, electrically variable Mode II. Thus, by connecting the input differential (i.e., node or gear set 20) with the reverse ratio module (i.e., node 40), at the end of Mode I by engagement of the clutch Mode II 59, the second electrically variable mode is established and is used as a high efficiency means of achieving higher vehicle propulsion speeds and ensuring low electrical power losses.

The first torque-transmitting mechanism, Mode I forward (MI F) brake 50, selectively connects the sun gear member 42 with the transmission housing 60. The second torque-transmitting mechanism, Mode I reverse (MI R) brake 52, selectively connects the carrier member 49 with the transmission housing 60. The third torque-transmitting mechanism, clutch 54, selectively connects Unit A 80 with the engine 12 and with the carrier member 29. The fourth torque-transmitting mechanism, disconnect clutch 56 selectively connects the second motor/generator 82 with the ring gear member 24. The fifth torque-transmitting mechanism, brake 58, selectively connects the ring gear member 24 with the transmission housing 60. Finally, the sixth torque-transmitting mechanism, Mode II clutch 59 selectively connects the input member 17 with the carrier member 49 via the interconnecting member 72. The torque-transmitting mechanisms 50, 52, 56, 58 and 59 are employed to assist in the selection of the operational states of the hybrid transmission 14, as well be hereinafter more fully explained. Operation of the transmission with two other clutches engaged while clutch 56 is engaged results in fixed input to output speed ratios of the transmission and can be selected while the engine is on.

General Operating Considerations

One of the primary control devices for an automatic transmission is a well known drive range selector (not shown) that directs an electronic control unit (the controller or ECU 88) to configure the transmission for either the park, reverse, neutral, or forward drive range. The second and third primary control devices constitute an accelerator pedal (not shown) and a brake pedal (also not shown). The information obtained by the ECU 88 from these three primary control sources is designated as the "operator demand." The ECU 88 also obtains information from a plurality of sensors (input as well as output) as to the status of: the torque-transmitting mechanisms (either applied or released); the engine output torque; the unified battery, or batteries, capacity level; and, the temperatures of selected vehicular components. The ECU 88 determines what is required and then manipulates the selectively operated components of, or associated with, the transmission appropriately to respond to the operator demand.

The transmission may use simple or compound planetary gear sets. In a simple planetary gear set a planet carrier assembly member includes a single set of planet gear members that are normally supported for rotation on a carrier member that is itself rotatable.

In a simple planetary gear set, when the sun gear member is held stationary and power is applied to the ring gear member of a simple planetary gear set, the planet gear members rotate in response to the power applied to the ring gear member and thus "walk" circumferentially about the fixed sun gear member to effect rotation of the carrier member in the same direction as the direction in which the ring gear member is being rotated.

When any two members of a simple planetary gear set rotate in the same direction and at the same speed, the third member is forced to turn at the same speed, and in the same direction. For example, when the sun gear member and the ring gear member rotate in the same direction, and at the same speed, the planet gear members do not rotate about their own axes but rather act as wedges to lock the entire unit together to effect what is known as direct drive. That is, the carrier member rotates with the sun and ring gears.

However, when the two gear members rotate in the same direction, but at different speeds, the direction in which the third gear member rotates may often be determined simply by visual analysis, but in many situations the direction will not be obvious and can only be accurately determined by knowing the number of teeth present on all the gear members of the planetary gear set.

Whenever the carrier member is restrained from spinning freely, and power is applied to either the sun gear member or the ring gear member, the planet gear members act as idlers. In that way the driven member is rotated in the opposite direction as the drive member. Thus, in many transmission arrangements when the reverse drive range is selected, a torque transfer device serving as a brake is actuated frictionally to engage the carrier member and thereby restrain it against rotation so that power applied to the sun gear member will turn the ring gear member in the opposite direction. Thus, if the ring gear member is operatively connected to the drive wheels of a vehicle, such an arrangement is capable of reversing the rotational direction of the drive wheels, and thereby reversing the direction of the vehicle itself.

In a simple set of planetary gear members, if any two rotational speeds of the sun gear member, the carrier member and the ring gear member are known, then the speed of the third member can be determined using a simple rule. The rotational speed of the carrier member is always proportional to the speeds of the sun gear member and the ring gear member, weighted by their respective numbers of teeth. For example, a ring gear member may have twice as many teeth as the sun gear member in the same set. The speed of the carrier member is then the sum of two-thirds the speed of the ring gear member and one-third the speed of the sun gear member. If one of these three members rotates in an opposite direction, the arithmetic sign is negative for the speed of that member in mathematical calculations.

The torque on the sun gear member, the carrier member and the ring gear member can also be simply related to one another if this is done without consideration of the masses of the gears, the acceleration of the gears, or friction within the gear set, all of which have a relatively minor influence in a well designed transmission. The torque applied to the sun gear member of a simple planetary gear set must balance the torque applied to the ring gear member, in proportion to the number of teeth on each of these gears. For example, the torque applied to a ring gear member with twice as many teeth as the sun gear member in that set must be twice that applied to the sun gear member, and must be applied in the same direction. The torque applied to the planet carrier assembly member must be equal in magnitude and opposite in direction to the sum of the torque on the sun gear member and the torque on the ring gear member.

In a compound planetary gear set, the utilization of inner and outer sets of planet gear members affects an exchange in the roles of the ring gear member and the carrier member in comparison to a simple planetary gear set. For instance, if the sun gear member is held stationary, the carrier member will rotate in the same direction as the ring gear member, but the carrier member with inner and outer sets of planet gears will travel faster than the ring gear member, rather than slower.

In a compound planetary gear set having meshing inner and outer sets of planet gears, the speed of the ring gear member is proportional to the speeds of the sun gear member and the carrier member, weighted by the number of teeth on the sun gear member and the number of teeth filled by the planet gear members, respectively. For example, the difference between the ring gear member and the sun gear member filled by the planet gear members might be as many teeth as are on the sun gear member in the same set. In that situation the speed of the ring gear member would be the sum of two-thirds the speed of the carrier member and one third the speed of the sun gear member. If the sun gear member or the carrier member rotates in an opposite direction, the arithmetic sign is negative for that speed in mathematical calculations.

If the sun gear member were to be held stationary, then a carrier member with inner and outer sets of planet gear members will turn in the same direction as the rotating ring gear member of that set. On the other hand, if the sun gear member were to be held stationary and the carrier member were to be driven, then planet gear members in the inner set that engage the sun gear member roll, or "walk," along the sun gear member, turning in the same direction that the carrier member is rotating. Pinion gears in the outer set that mesh with pinion gears in the inner set will turn in the opposite direction, thus forcing a meshing ring gear member in the opposite direction, but only with respect to the planet gear members with which the ring gear member is meshingly engaged. The planet gear members in the outer set are being carried along in the direction of the carrier member. The effect of the rotation of the pinion gears in the outer set on their own axis and the greater effect of the orbital motion of the planet gear members in the outer set due to the motion of the carrier member are combined, so the ring gear member rotates in the same direction as the carrier member, but not as fast as the carrier member.

If the carrier member in such a compound planetary gear set were to be held stationary and the sun gear member were to be rotated, then the ring gear member will rotate with less speed and in the same direction as the sun gear member. If the ring gear member of a simple planetary gear set is held stationary and the sun gear member is rotated, then the carrier member supporting a single set of planet gear members will rotate with less speed and in the same direction as the sun gear member. Thus, one can readily observe the exchange in roles between the carrier member and the ring gear member that is caused by the use of inner and outer sets of planet gear members which mesh with one another, in comparison with the usage of a single set of planet gear members in a simple planetary gear set.

The normal action of an electrically variable transmission is to transmit mechanical power from the input to the output. As part of this transmission action, one of its two motor/generators acts as a generator of electrical power. The other motor/generator acts as a motor and uses that electrical power. As the speed of the output increases from zero to a high speed, the two motor/generators 80, 82 gradually exchange roles as generator and motor, and may do so more than once. These exchanges take place around mechanical points, where essentially all of the power from input to output is transmitted mechanically and no substantial power is transmitted electrically.

In a hybrid electrically variable transmission system, the battery 86 may also supply power to the transmission or the transmission may supply power to the battery. If the battery is supplying substantial electric power to the transmission, such as for vehicle acceleration, then both motor/generators may act as motors. If the transmission is supplying electric power to the battery, such as for regenerative braking, both motor/generators may act as generators. Very near the mechanical points of operation, both motor/generators may also act as generators with small electrical power outputs, because of the electrical losses in the system.

Contrary to the normal action of the transmission, the transmission may actually be used to transmit mechanical power from the output to the input. This may be done in a vehicle to supplement the vehicle brakes and to enhance or to supplement regenerative braking of the vehicle, especially on long downward grades. If the power flow through the transmission is reversed in this way, the roles of the motor/generators will then be reversed from those in normal action.

Specific Operating Considerations

Each of the embodiments described herein (FIGS. 1 and 3) has many operating states. These operating states are described below.

A first operating state is the "energy storage supplied reverse propulsion mode." In this mode, the engine is off and the transmission element connected to the engine is not controlled by engine torque, though there may be some residual torque due to the rotational inertia of the engine. The EVT is driven by one of the motor/generators using energy from the energy storage device, causing the vehicle to move in reverse. Depending on the kinematic configuration, the other motor/generator may or may not rotate in this mode, and may or may not transmit torque. If it does rotate, it is used to generate energy which is stored in the battery. In the embodiment of FIG. 1, in the battery reverse state, the brake 52 is engaged, the motor/generator 80 has zero torque, and the motor/generator 82 provides a reverse torque ratio through active gear sets 30 and 40.

A second operating state e is the "EVT reverse mode." In this drive EVT reverse mode, power is supplied to the transmission by the engine and by one of the motor/generators. The other motor/generator operates in generator mode and transfers the generated energy back to the control module 88, which may transfer its power to the battery or driving motor. The net effect is to drive the vehicle in reverse. Referring to FIG. 1, in the EVT reverse mode, the brake 52 and clutch 56 are engaged. With clutch 56 engaged, gear set 20 is active, Unit A 80 acts as a generator, and Unit B 82 powers the final drive 16 in an opposite (reverse) direction as input member 17. This gear schematic is unique in that Unit B and the engine torques are both positive, providing additive torque input into gear sets 30 and 40 which then provides a reverse mechanical advantage to the output member 19.

A third operating state includes reverse and forward fixed low ratio operation. In this state, the transmission is driven by the engine and/or both of the motor/generators. Referring to FIG. 1, in the reverse and forward modes, clutches 54, 56 and either 50 or 52 (depending on whether forward or reverse launch is desired) are engaged. In this mode, either motor/generator can operate as a motor or as a generator, independently as desired.

Figure 2:
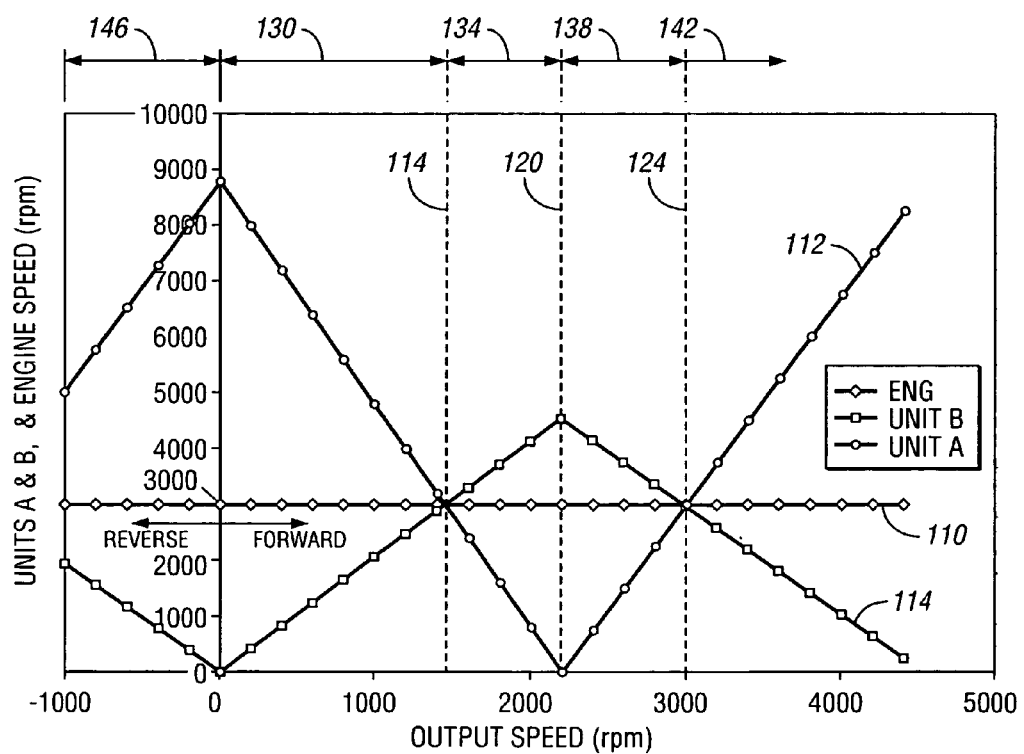
FIG. 2 is a chart of component speeds versus output speed of various components of the powertrain of FIG. 1.
Figure 4:
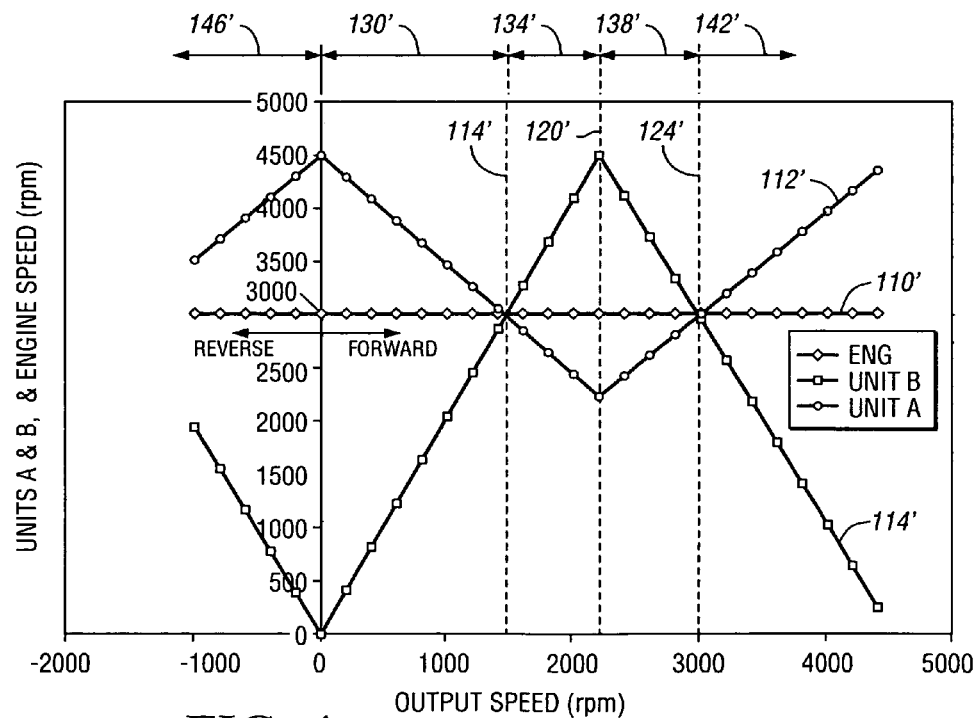
FIG. 4 is a chart of component speeds versus output speed of various components of the transmission of FIG. 3.

A fourth operating state is a "continuously variable transmission range mode" which includes the EVT ranges shown and described with respect to FIGS. 2 and 4. In this mode, the EVT is driven by the engine as well as one of the motor/generators operating as a motor. The other motor/generator typically operates as a generator and transfers the generated energy back to the control module 88. Actual operation as a motor or generator of the second unit depends on battery power, internal speeds, engine power, and many other factors. The operating points represented by the EVT forward modes are discrete points, for given input speeds, in the continuum of forward speed ratios provided by the EVT.

A fifth operating state includes the "fixed ratio" modes. In this mode the transmission operates like a conventional automatic transmission, with three torque transfer devices engaged to create a discrete transmission ratio. With clutch 56 engaged, and with the addition of a brake on Unit B, up to six forward and one reverse fixed mechanical ratios are provided between the input member 17 and output member 19.

The transmission 14 is capable of operating in so-called single or dual modes. In single mode, an engaged torque-transmitting mechanism remains the same for the entire continuum of forward speed ratios. In dual mode, the engaged torque-transmitting mechanism is switched at some intermediate speed ratio (e.g., line 120 of FIG. 2). Depending on the mechanical configuration, this change in torque-transmitting mechanism engagement has advantages in reducing element speeds in the transmission and improving power flow and efficiency.

In this transmission, it is possible to synchronize clutch element slip speeds such that shifts are achievable with minimal torque disturbance (so-called "cold" shifts). For example, the transmission of FIG. 1 has a cold shift between ranges 134 and 138 (i.e., at an output speed at line 120). The speed of the carrier member 39 is the same as the speed of the engine 12 at line 120. At this condition, a clutching mechanism may be synchronously applied. This mechanism, MI clutch 59 has no energy loss and therefore no temperature rise, resulting in the term "cold" shift.

Referring again to FIG. 1, the gear tooth ratios of the planetary gear sets 20, 30 and 40 of the transmission 14 may be varied as desired to obtain desired speed ratios. The transmission 14 may obtain at least six forward speed ratios (if a brake (not shown) is added to Unit B or Unit B operated as an electromagnetic brake) as well as a fixed-reverse, an electrically variable reverse and a battery reverse speed ratio. By way of example, assuming the tooth ratio of the planetary gear set 20 (i.e., the $N_{R1}/S_{R1}$) is 1.954 (tooth counts of 86 and 44 for ring gear member 24 and sun gear member 22, respectively), the $N_{R2}/S_{R2}$ value of the planetary gear set 30 is 2.774 (tooth counts of 86 and 31 for ring gear member 34 and sun gear member 32, respectively) and the $N_{R3}/S_{R3}$ value of the planetary gear set 40 is 1.954 (tooth counts of 86 and 44 for ring gear member 44 and sun gear member 42, respectively), then a reverse speed ratio of Unit B relative to the output member 19 of −1.931 may be obtained by engaging clutches 52 and 56. Likewise, a substantially identical forward speed ratio of Unit B relative to the output member 19 of 2.057 may be obtained by engaging clutches 50 and 56. The first electrically variable forward speed ratio is obtained in Mode I, and is a first input-split variable launch mode of operation.

The clutch 59 may be simultaneously engaged as clutch 50 is disengaged in order to obtain a compound split Mode II mode of operation with higher speeds and efficiencies. Additionally, when clutches 59, 58 and 56 are engaged, a high efficiency mechanical fixed mode of operation is achieved.

Starting the engine in the energy storage propulsion forward or reverse states is accomplished by power being supplied to Unit A from the controller 88. These electric forward and reverse speed ratios powered by Unit B are available when the clutch 56 is disengaged from Unit B. More detailed examples of the variety of speed ratios available with embodiments of the invention are provided in the charts of FIGS. 2 and 4 relating to the respective transmissions of FIGS. 1 and 3, respectively.

FIG. 2 is a graphical depiction of the speeds of various transmission components with respect to the speed of the output shaft in an exemplary operation of transmission 14. Referring to FIGS. 1 and 2, the speed of the engine 12 (and input shaft 17) is depicted by line 110, the speed of motor/generator 80 is depicted by line 112, the speed of motor/generator 82 is depicted by line 114. In a first forward range or mode 130 of EVT operation, i.e., prior to output shaft speed 114, clutches 50 and 56 are engaged. Planetary gear set 20 operates in a differential mode, and planetary gear sets 30 and 40 operate in a torque multiplication mode. Input shaft speed 110, and correspondingly the speed of the engine, is substantially constant throughout the operation of the transmission to simplify description. The controller 88 causes the speed of the first motor/generator 80 to start at about 8800 rpm and decrease with increasing output shaft speed. Simultaneously, the speed of the second motor/generator 82 starts at zero and increases with increasing output shaft speed. The speed of carriers members 39 and 49 (not shown in FIG. 2) start at zero rpm and rise proportionally with the output shaft speed. As is apparent from the chart of FIG. 2, for a given input or component speed, the motor/generator speeds are equal (although opposite in direction) in the mode 130 and in a reverse electrically variable mode 146, as selected by engaging either clutch 50 (for forward) or clutch 52 (for reverse) while clutch 56 remains engaged.

At output shaft speed 114, the speed of motor/generator 82 (Unit B) surpasses that of the engine 12 while the speed of motor/generator 80 (Unit A) falls below that of the engine 12. The speed ranges denoted by 130 and 134 together constitute a Mode I forward range of operation. At an output speed 120 near 2200 rpm, the differential speed of Mode II clutch 59 is zero, and the transmission 14 is shifted from the first EVT range or Mode I (including speed ranges 130, 134), to a second EVT range or Mode II (including speed ranges 138 and 142). For this example, Unit A happens to also be at zero speed, although that may depend on numerical values within gear sets. At output shaft speed 120, the speeds of the engine 12 and carrier members 49 are substantially equal due to the engagement of clutches 50 and 56, so that clutch 59 is engaged (and clutch 50 disengaged) with essentially no resulting torque disturbance to shift from the first electrically variable mode (Mode I) to the second electrically variable mode (Mode II). In Mode II, the speed of motor/generator 80 continues to increase with increasing output shaft speed, and the speed of motor/generator 82 decreases with increasing output shaft speed.

The transmission 14 is also characterized by a reverse mode 146. At zero output speed, the clutches 52 and 56 may be engaged. The ratios of the active planetary gear sets 20, 30 and 40 are such that a negative ratio substantially equal in value to the value of the ratio in EVT forward mode 130, 134 through active gear sets 20, 30 is achieved. Thus, the EVT path may be operated precisely as it is in the forward first mode, thereby providing equal reverse performance. A mechanical (fixed) reverse ratio equal to the ring gear/sun gear tooth ratios of the planetary gear sets 30 and 40 is achieved by engaging clutches 52, 54 and 56.

The transmission 14 may achieve a reverse speed ratio in three different ways: via a fixed ratio, an electrically variable ratio or an engine disconnected "battery reverse" ratio. The fixed reverse ratio is achieved by the engagement of clutches 54 and 56 as well as brake 52. With the engagement of clutch 54, gear set 20 is inactive because motor/generator 80 is connected to both the sun gear member 22 and the carrier member 29. At zero output speed, the speed of Unit B 82 is zero (as noted in the representative speed diagram of FIG. 2). Thus, engine torque flows through the third gear set 40 to achieve a reverse fixed ratio.

The electrically variable reverse ratio (EVT Reverse) is achieved with the engagement of the MI R brake 52 and the clutch 56. This allows Unit B 82 to power the ring gear member 44, while the engine 12 provides power to the carrier member 49 and the output ratio is provided at the output member 19 from the carrier member 39.

The battery reverse ratio is achieved when clutch 56 is not engaged, so that engine 12 is disconnected, while clutch 52 is engaged, allowing Unit B 82 to power the output member 19 in reverse.

A Mode I electrically variable first forward range speed ratio (for given input speeds) is achieved by engagement of the clutches 50 and 56. The Mode I electrically variable first forward range ratio is an input-split ratio, as torque from the input shaft 17 flows through the active planetary gear set 20. By synchronously engaging the clutch 54 to connect the Unit A 80 to the carrier member 29 and thereby lock the planetary gear set 20, Units A and B 80, 82 and the engine 12 thereby drive the transmission through a fixed, low ratio provided at the combined planetary gear sets 30, 40.

A Mode I electrically variable second forward range ratio (for given input speeds) is achieved by engaging the clutches 50, 56 when the speed of Unit A 80 is zero. A Mode I–Mode II fixed shift ratio is obtained at a shift point when both the clutch 50 and the clutch 59 are engaged. A Mode II electrically variable first forward range ratio for given input speeds is achieved with the engagement of the clutches 59 and 56 when the speed of Unit A 80 equals zero.

With the engagement of the clutch 54 in addition to the clutches 59 and 56, a fixed direct ratio of 1.00 is achieved. The planetary gear set 20 is locked as the speed of Unit A 80 is provided at both the sun gear member 22 and the carrier member 29. Neither planetary gear sets 30 and 40 are active as clutches 50 and 52 are both disengaged. Thus, engine speed is effectively provided at the output member 19 and, accordingly, the ratio achieved is 1.00.

With the engagement of only the clutches 59 and 56 when the speed of Unit B 82 equals zero rpm, a Mode II electrically variable second forward range speed ratio for given input speeds is achieved. By then adding an engagement of the brake 58, a fixed forward speed ratio is provided.

Thus, with the Mode I electrically variable first range forward ratio, second range forward ratio; the Mode I-Mode II shift ratio, the direct ratio, and the Mode II electrically variable first and second forward range ratios, six forward ratios are provided. The Mode I electrically variable second forward ratio, the Mode II electrically variable first forward ratio and the Mode II electrically variable second forward ratio cited-above may become fixed ratios if Units A and B are braked. Thus, by engaging torque-transmitting mechanisms 56 and 58 to lock Unit B, and by adding a brake to brake Unit A, these ratios become fixed ratios; thus, six fixed forward ratios may be provided, if desired for a particular transmission application. This may also depend on the number of times the unit speeds of Unit A 80, Unit B 82 and the engine 12 are zero over the range of output speeds shown in FIG. 2 (i.e., the number of intersections of the unit speeds at zero (the X axis) of FIG. 2).

Second Schematic Embodiment

Figure 3:
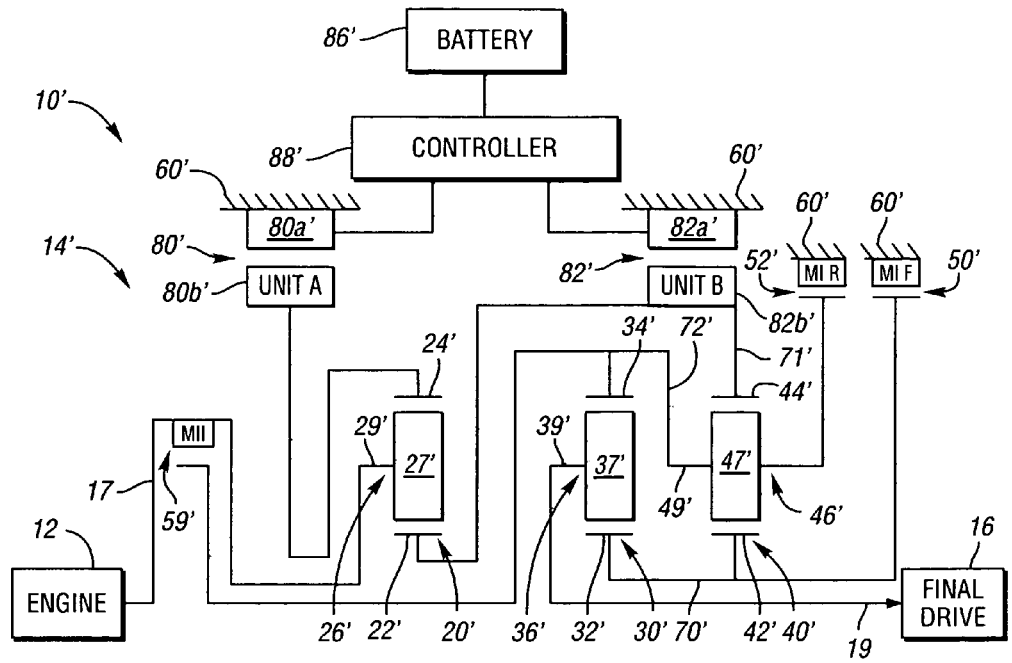
FIG. 3 is a schematic illustration of a powertrain including a second embodiment of an electrically variable transmission of the present invention.

Referring to FIG. 3, a second completed schematic preferred embodiment of a powertrain 10' having a transmission 14' is depicted. The transmission 14' utilizes three differential gear sets, preferably in the nature of planetary gear sets 20', 30' and 40'. The planetary gear set 20' employs a ring gear member 24' which circumscribes a sun gear member 22'. A planet carrier assembly member 26' includes a carrier member 29' that rotatably supports the plurality of planet gears 27' such that each planet gear 27' meshingly engages both the ring gear member 24' and the sun gear member 22'. The input member 17 is secured to the carrier member 29.

The planetary gear set 30' has a ring gear member 34' which circumscribes a sun gear member 32'. The plurality of planet gears 37' are rotatably mounted on a carrier member 39' of a planet carrier assembly member 36' such that each planet gear member 37' simultaneously and meshingly engages both the ring gear member 34' and the sun gear member 32'.

The planetary gear set 40' also has a ring gear member 44' which circumscribes a sun gear member 42'. A plurality of planet gears 47' are rotatably mounted on a carrier member 49' of a planet carrier assembly member 46' such that each simultaneously and meshingly engages both the ring gear member 44' and the sun gear member 42'.

An interconnecting member 70' continuously connects the sun gear members 32' and 42'. Additionally, an interconnecting member 72' continuously interconnects the ring gear member 34' with the carrier member 49'.

The transmission 14' also incorporates first and second motor/generators 80' and 82', each having respective stators 80a', 82a' secured to transmission housing 60'. The rotor 80b' of Unit A is secured to the ring gear member 24'. The rotor 82a' of Unit B is secured to the sun gear member 22' and also to the ring gear member 44'. The planetary gear set 20' is designed (via gear tooth numbers and connection of the engine 12 to the carrier member 29') so that connecting member 71' rotates in the same direction as the engine 12.

The first torque-transmitting mechanism, such as forward mode brake MI F 50' is selectively engageable with the sun gear member 42' (and thereby to the sun gear member 32' via the interconnecting member 70') to ground the sun gear member 42' by the transmission housing 60'. A second torque-transmitting mechanism such as reverse brake MI R 52' selectively connects the carrier member 49' with the transmission housing 60'. Finally, a third torque-transmitting mechanism, such as a clutch 59', selectively connects the engine 12 with the ring gear member 34' and thereby with the carrier member 49' via the interconnecting member 72'. The clutch 59' is referred to as the Mode II clutch. The transmission 14' does not have torque-transmitting mechanisms that perform the lock-up, engine start reaction and Unit B disconnect functions performed respectively by clutches 54, 58 and 56 of transmission 14.

It is apparent from FIG. 3 that the transmission 14' selectively receives power from the engine 12. The hybrid transmission 14' also receives power from a battery or electrical power source 86', which is operably connected to a controller or ECU 88'. Energy is transferred between the battery 86' and the motors/generators 80', 82' via the controller 88', as is understood by those skilled in the art. The electric power source 86' may be one or more batteries. Other electric power sources, such as fuel cells, have the ability to provide, or store and dispense, electric power may be used in place of batteries without altering the concepts of the present invention. The ECU 88' is programmed to ensure that Unit B 82' rotates in a direction so that torque from Unit B 82' is added to torque from the engine 12 at the connecting member 71.

FIG. 4 is a graphical depiction of the speeds of various transmission components with respect to the speed of the output shaft in an exemplary operation of transmission 14'.

Referring to FIGS. 3 and 4, the speed of the engine 12 (and input shaft 17) is depicted by line 110', the speed of motor/generator 80' is depicted by line 112', the speed of motor/generator 82' is depicted by line 114'. In a first forward range or mode 130' of EVT operation, i.e., prior to output shaft speed 120', torque-transmitting mechanisms 50' and 56' are engaged. Gear set 20' operates in a differential mode, and gear set 30' operates in a torque multiplication mode. Input shaft speed 110', and correspondingly the speed of the engine, is substantially constant throughout the operation of the transmission to simplify description. The controller 88' causes the speed of the first motor/generator 80' to start at about 4500 rpm and decrease with increasing output shaft speed. Simultaneously, the speed of the electric machine 82' starts at zero and increases with increasing output shaft speed. The speed of carrier members 39' and 49' (not shown in FIG. 4) rise proportionally with the output shaft speed. As is apparent from the chart of FIG. 4, for a given input or component speed, the motor/generator speeds are equal (although opposite in direction) in the mode 130' and in a reverse mode 146', as selected by engaging either clutch 50' (for forward) or clutch 52' (for reverse) while clutch 56' remains engaged.

At output shaft speed 114', the speed of motor/generator 82' (Unit B) surpasses that of the engine 12 while the speed of motor/generator 80' (Unit A) falls below that of the engine 12. The speed ranges denoted by 130' and 134' together constitute a Mode I forward range of operation. At output shaft speed 120', the transmission is shifted from EVT Mode I (including speed ranges 130', 134'), to EVT Mode II including speed ranges 138', 142'. At output shaft speed 120', the speeds of the engine 12 and carrier member 49' are substantially equal due to the engagement of clutches 50' and 56', so that clutch 59' is engaged (and clutch 50' disengaged) with essentially no resulting torque disturbance to shift from the first electrically variable mode (Mode I) to the second electrically variable mode (Mode II). In Mode II, the speed of motor/generator 80' continues to increase with increasing output shaft speed, and the speed of motor/generator 82' decreases with increasing output shaft speed.

The transmission 14' is also characterized by an EVT reverse mode 146'. At zero output speed, the clutches 52' and 56' may be engaged. The ratios of the active planetary gear sets 20' and 40' are such that a negative ratio substantially equal in value to the value of the ratio in EVT forward Mode I 130', 134', for given input speeds, through active gear sets 20', 30' is achieved. Thus, the EVT path may be operated precisely as it is in the EVT forward Mode I, thereby providing equal reverse performance.

While the best modes for carrying out the invention have been described in detail, those familiar with the art to which this invention relates will recognize various alternative designs and embodiments for practicing the invention within the scope of the appended claims.

The invention claimed:

1. An electrically variable transmission comprising:
first and second motor/generators;
first, second and third differential gear sets, each having first, second and third members, said first and second motor/generators being continuously connected to respective ones of said differential gear sets and controllable to provide power thereto;
a plurality of torque-transmitting mechanisms;
an input member to receive power from a power source and being continuously connected to a member of one of said gear sets;
an output member continuously connected to another member of one of said gear sets;
said plurality of torque-transmitting mechanisms being selectively engageable to transfer power received by said input member from the power source through said differential gear sets to provide an input-split, electrically variable first mode having a forward and a reverse range with respective equal forward and reverse speed ratios for given input speeds; and
wherein said first differential gear set is interconnected between said input member and said second motor/generator such that a connecting member between said second motor/generator and one of said other differential gear sets rotates in a same direction as said input member so that torque provided from the power source is added to torque provided from said second motor/generator at said output member.

2. The electrically variable transmission of claim 1, wherein said torque-transmitting mechanisms are further selectively engageable to provide a compound-split, electrically variable second mode.

3. The electrically variable transmission of claim 1, wherein said torque-transmitting mechanisms are further selectively engageable to provide substantially equal fixed forward and fixed reverse speed ratios of said output member to said input member.

4. The electrically variable transmission of claim 1, wherein said torque-transmitting mechanisms are further selectively engageable to provide substantially equal fixed forward and fixed reverse speed ratios of said output member to said second motor/generator for a given speed of said second motor generator for equal engine off performance.

5. The electrically variable transmission of claim 1, further comprising:
an energy storage device operable for supplying power to or receiving power from said first and second motor/generators;
a controller operable for controlling power transfer between said energy storage device and said first and second motor/generators; and
wherein said controller causes said first motor/generator to transfer the power received by said input member from the power source to said energy storage device during shifts in selective engagement of said torque-transmitting mechanisms.

6. The electrically variable transmission of claim 1, wherein at least one of said torque-transmitting mechanisms is selectively engageable such that power provided by said first motor/generator is added to power provided by the power source and power provided by said second motor/generator, thus providing equal and sufficient launch power performance in either said electrically variable first mode forward or reverse range.

7. The electrically variable transmission of claim 1, wherein said third differential gear set is characterized by a torque load of substantially zero in said electrically variable first mode forward range; and
wherein one of said plurality of torque-transmitting mechanisms is engaged synchronously with disengagement of another of said torque-transmitting mechanisms to apply torque load to said third differential gear set and shift from said electrically variable first mode to an electrically variable, compound-split second mode.

8. The electrically variable transmission of claim 1, wherein one of said torque-transmitting mechanisms is selectively engageable such that said first motor/generator is operable for starting the power source to thereby provide torque at said input member.

9. The electrically variable transmission of claim 8, wherein said one of said torque-transmitting mechanisms is a brake selectively engageable with a transmission housing to thereby provide reaction torque at the transmission housing when said first motor/generator starts the power source.

10. An electrically variable transmission comprising:
an input member to receive power from a power source;
an output member;
first and second motor/generators;
first, second and third differential gear sets each having first, second and third members;
said input member being continuously connected with said first member of said first gear set, and said output member being continuously connected with a member of one of said second or third gear sets;
said first motor/generator being continuously connected with said second member of said first gear set;
a rotatable connecting member;
said second motor/generator being continuously connected with said first member of said third gear set via said rotatable connecting member;
at least one interconnecting member continuously interconnecting one of said members of said second gear set with one of said members of said third gear set; and
a plurality of torque-transmitting mechanisms selectively engageable to provide substantially equal torque at said output member for given input speeds in an electrically variable first mode forward range and in an electrically variable first mode reverse range;
wherein said first gear set is interconnected between said input member and said second motor/generator and said second motor/generator is controlled such that said connecting member rotates in a same direction as said input member so that torque provided from the power source is added to torque provided from said second motor/generator at said output member.

11. The electrically variable transmission of claim 10, wherein at least one of said torque-transmitting mechanisms is selectively engageable such that torque provided from said first motor/generator is added to said torque from the power source and said torque provided from said second motor/generator, thus providing launch torque in either said electrically variable first mode forward or reverse range.

12. The electrically variable transmission of claim 10, wherein said first motor/generator is operable for starting the power source in either said electrically variable first mode forward or electrically variable first mode reverse range so that the power source provides power at said input member.

13. The electrically variable transmission of claim 10, wherein ones of said plurality of torque-transmitting mechanisms the selective engagement of which determines whether said electrically variable first mode forward or said electrically variable first mode reverse range is provided are disposed between said second motor/generator and said output member.

14. The electrically variable transmission of claim 10, wherein one of said plurality of torque-transmitting mechanisms is engaged synchronously with disengagement of another of said torque-transmitting mechanisms to apply torque load to said third gear set and shift from said electrically variable first mode forward range to an electrically variable, compound-split second mode.

15. The electrically variable transmission of claim 10, wherein said selective engagement of said plurality of torque-transmitting mechanisms provides said electrically variable first mode forward and reverse ranges, an electrically variable second mode and six fixed forward speed ratios.

16. The electrically variable transmission of claim 10, wherein said plurality of torque-transmitting mechanisms include a first brake and a second brake, said first brake being selectively engageable to connect said member of one of said second and third gear sets continuously connected with said output member with a transmission housing, said second brake being selectively engageable to connect another member of said one of said second and third gear sets with the transmission housing, simultaneous engagement of both said first and second brakes thereby locking said output member such that it is characterized by a speed of zero, the transmission housing thereby providing reaction torque to reduce electrical loading when torque is applied to said output member at zero output speed.

17. The electrically variable transmission of claim 10, wherein one of said torque-transmitting mechanisms is engaged synchronously with disengagement of another of said torque-transmitting mechanisms to shift between said electrically variable first mode forward and said electrically variable first mode reverse ranges when said output member is characterized by a speed of zero.

18. The electrically variable transmission of claim 17, wherein said second motor/generator is characterized by a speed of zero when said output member is characterized by the speed of zero, thereby causing said second and third gear sets to each be characterized by a speed of zero to reduce frictional spin losses during said shift between said electrically variable first mode forward and reverse ranges.

19. An electrically variable transmission comprising:
an input member to receive power from a power source;
an output member;
first and second motor/generators;
first, second and third differential gear sets each having first, second and third members;
said input member being continuously connected with said first member of said first gear set, and said output member being continuously connected with said first member of said second gear set;
said first motor/generator being continuously connected with said second member of said first gear set;
a rotatable connecting member;
said second motor/generator being continuously connected with said first member of said third gear set via said rotatable connecting member;
a first interconnecting member continuously connecting said second member of said second gear set with said second member of said third gear set;
a second interconnecting member continuously connecting said third member of said second gear set with said third member of said third gear set;
a plurality of torque-transmitting mechanisms selectively engageable to provide substantially equal torque at said output member for given input speeds in an electrically variable first mode forward range and in an electrically variable first mode reverse range; and
wherein said first gear set is interconnected between said input member and said second motor/generator such that said rotatable connecting member rotates in a same direction as said input member so that torque provided from the power source is added to torque provided from said second motor/generator at said output member.

* * * * *